United States Patent
Huang

(10) Patent No.: US 8,896,541 B2
(45) Date of Patent: Nov. 25, 2014

(54) SPLIT KEYBOARD FOR A TABLET COMPUTER

(71) Applicant: Richard Yao Tien Huang, Fremont, CA (US)

(72) Inventor: Richard Yao Tien Huang, Fremont, CA (US)

(73) Assignee: Geartonomy, Inc., Fremont, CA (US)

( * ) Notice: Subject to any disclaimer, the term of this patent is extended or adjusted under 35 U.S.C. 154(b) by 0 days.

(21) Appl. No.: 13/959,031

(22) Filed: Aug. 5, 2013

(65) Prior Publication Data
US 2014/0168085 A1    Jun. 19, 2014

Related U.S. Application Data

(63) Continuation of application No. 13/946,029, filed on Jul. 19, 2013, now abandoned.

(60) Provisional application No. 61/737,100, filed on Dec. 14, 2012.

(51) Int. Cl.
*G06F 3/02* (2006.01)

(52) U.S. Cl.
CPC .................................. *G06F 3/02* (2013.01)
USPC .............................................. 345/168

(58) Field of Classification Search
None
See application file for complete search history.

(56) References Cited

U.S. PATENT DOCUMENTS

| | | | |
|---|---|---|---|
| 4,661,005 A | 4/1987 | Lahr | |
| 6,028,538 A * | 2/2000 | Ramesh et al. | 341/24 |
| 6,157,958 A | 12/2000 | Armitage et al. | |
| 6,983,175 B2 | 1/2006 | Kwon | |
| 7,253,750 B2 | 8/2007 | Sheehan et al. | |
| 7,646,316 B2 * | 1/2010 | Khoo | 341/22 |
| 8,244,319 B2 | 8/2012 | Paschke et al. | |
| 2006/0210340 A1 * | 9/2006 | Atzmon | 400/472 |
| 2007/0049355 A1 | 3/2007 | Wu | |
| 2010/0207888 A1 | 8/2010 | Camiel | |
| 2011/0267274 A1 * | 11/2011 | Shusteri | 345/168 |
| 2012/0044147 A1 | 2/2012 | Roka | |
| 2012/0057289 A1 | 3/2012 | Champion | |
| 2012/0062465 A1 * | 3/2012 | Spetalnick | 345/168 |

(Continued)

FOREIGN PATENT DOCUMENTS

WO    2012129667 A1    10/2012

OTHER PUBLICATIONS

The Human Solution, "Goldtouch Go! Bluetooth Wireless Keyboard", http://www.thehumansolution.com/goldtouch-go-bluetooth-wireless-keyboard.html, Downloaded from the Internet on Apr. 4, 2013.

(Continued)

*Primary Examiner* — Yong H Sim
(74) *Attorney, Agent, or Firm* — Beck & Tysver PLLC

(57) ABSTRACT

A dual keyboard system is presented for use with a tablet computer. Each keyboard is attached to a suction cup via a hinge. The suction cups attach to the display face of the tablet computer. The keyboards can be rotated about the hinge to allow viewing of the full display of the tablet computer without detaching the keyboards. In one embodiment, the hinge is separable, allowing removal of the keyboards completely while leaving the suction cups attached to the tablet computer. In another embodiment, a master keyboard receives keystrokes directly from a slave keyboard as well as from keys located on the master keyboard. The tablet computer communicates only with the master keyboard via a radio frequency link. The slave keyboard communicates with the master keyboard via a radio frequency or infrared link.

10 Claims, 7 Drawing Sheets

(56) References Cited

U.S. PATENT DOCUMENTS

2013/0016468 A1 1/2013 Oh
2013/0033807 A1 2/2013 Kim
2013/0048809 A1 2/2013 Jacobson

OTHER PUBLICATIONS

Dec. 4, 2013 USPTO Office Action (U.S. Appl. No. 13/946,029)—Our Matter 5020.

* cited by examiner

SPLIT KEYBOARD FOR A TABLET COMPUTER

CROSS REFERENCE TO RELATED APPLICATION

This application claims the benefit of U.S. Provisional Application No. 61/737,100, filed Dec. 14, 2012, which is hereby incorporated by reference.

FIELD OF THE INVENTION

The present application relates to the field of keyboards for computing devices. More particularly, the described embodiments relate to a split keyboard for use with tablet computers.

SUMMARY

One embodiment of the present invention provides a physical keyboard system that can be attached to the front face of a tablet computer. The keyboard system utilizes two separate keyboards, with a first keyboard for use with one hand on a first side of the tablet computer, and a second keyboard for use with a second hand on a second side of the tablet computer. Each keyboard can be attached to the display screen of the tablet computer using a suction cup and one or more stabilizing feet. The keyboards are connected to their respective suction cups via a separable hinge, which allows the keyboards to be tilted upwards to allow access to that portion of the tablet computer found under the keyboard.

In one of the embodiments, the two keyboards each contain a different set of physical keys. A first one of the keyboards has a wireless connection to the second keyboard. The second keyboard has a wireless connection to the tablet computer. Keystrokes received at the second keyboard are converted to a wireless signal that is sent to the tablet computer over the wireless connection between the second keyboard and the tablet computer. Keystrokes received at the first keyboard are converted to a wireless signal that is sent to the second keyboard. The second keyboard then utilizes the received signal to generate another wireless signal that is sent as a keystroke to the tablet computer. Because there is an inherent delay caused by the additional processing and transmission for keystrokes received on the first keyboard, one embodiment of the present invention inserts a delay in the processing of keystrokes from the second keyboard. In one embodiment, the first keyboard transmits signals to the second keyboard via an infrared light signal, while the second keyboard transmits data to the tablet computer via a Bluetooth wireless connection.

DETAILED DESCRIPTION

Figure 1:
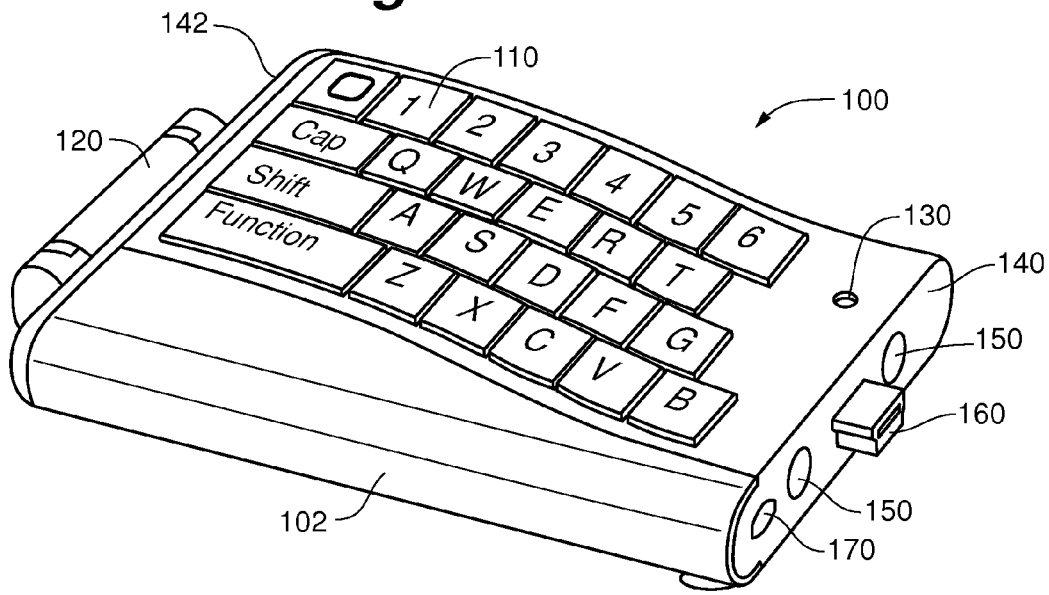
FIG. 1 is a perspective view of a first keyboard that forms part of a split keyboard system.

FIG. 1 shows a first keyboard 100 that forms one half of a split keyboard system. This keyboard 100 has a body section 102 that includes a plurality of physical keys 110. In the embodiment shown in FIG. 1, each key 110 can be pressed physically inward into the keyboard 100 to trigger a switch (not shown) located underneath the key 110. The switching mechanism may be a dome-switch, as is well known in the prior art of keyboard construction. Other switch technologies could also be used, such as a membrane switch, a scissor-switch, a buckling-spring switch, a capacitive switch, or a hall-effect switch. It is also possible to implement the keys 110 with a touch-sensitive surface that does not require the physical translation of the key 110 to register the user's keystroke.

The keyboard 100 is attached to a tablet computer via a hinged attachment mechanism, such as the separable hinge 120. The hinge 120 includes a mechanism to attach the keyboard to the face of a tablet computer (such as the suction cup 510 discussed below in connection with FIG. 5). By using a hinged attachment mechanism 120, the keyboard 100 can be folded up away from the tablet computer to temporarily allow a user to view beneath the keyboard 100. In FIG. 1, the hinged attachment mechanism 120 is located on side 142 of the keyboard body 102 nearest the shift and function keys 110.

The keyboard 100 is designed to wirelessly communicate each stroke of its keys 110. Since the keyboard 100 does not receive power through a wired connection to a power source, the keyboard 100 requires battery power in order to operate. Like other battery-powered keyboards, keyboard 100 can save battery power by effectively turning off when no key 110 has been pressed for a period of time. The keyboard uses a power light 130 to communicate to the user that the keyboard 100 is currently powered on and has sufficient battery power to operate. In some embodiments, the power light 130 is able to communicate when battery power is low, such as by blinking. In still other embodiments, the color of the power light 130 may indicate the connection status of the keyboard 100 (whether the keyboard 100 has established a data connection to another device).

Figure 2:
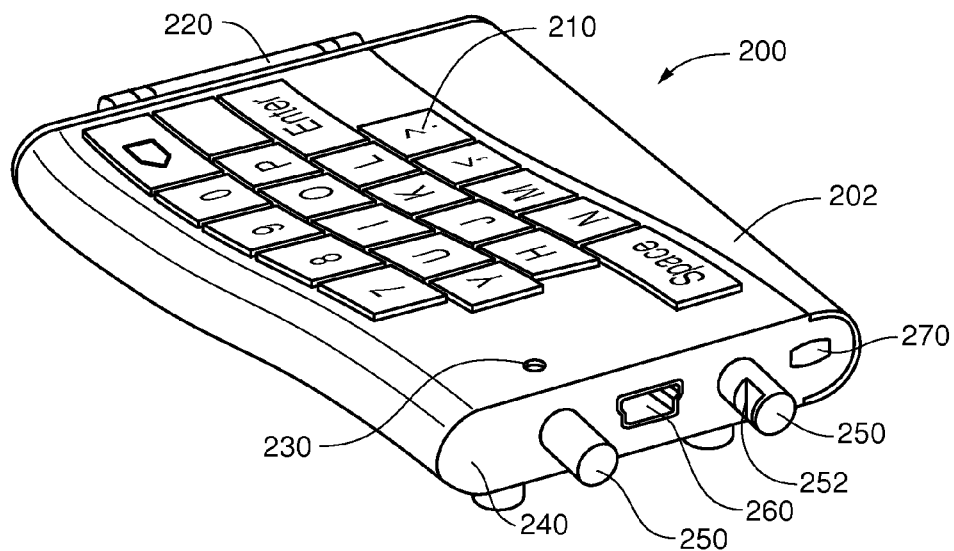
FIG. 2 is a perspective view of a second keyboard that forms part of the split keyboard system.

FIG. 2 shows a second keyboard 200 that forms the second half of a split keyboard system. Like the first keyboard 100, the second keyboard has a body 202 containing a plurality of keys 210 that are linked to a mechanism to receive keystrokes from a user. The second keyboard 200 also has a separable hinge 220 to attach the keyboard 200 to a display face of a tablet computer and a power indicator light 230 to disclose power and connection status to a user. The second keyboard 200 can also move to a lower power mode during periods of non-use in order to save battery power, as described previously in connection with the first keyboard 100.

Figure 3:
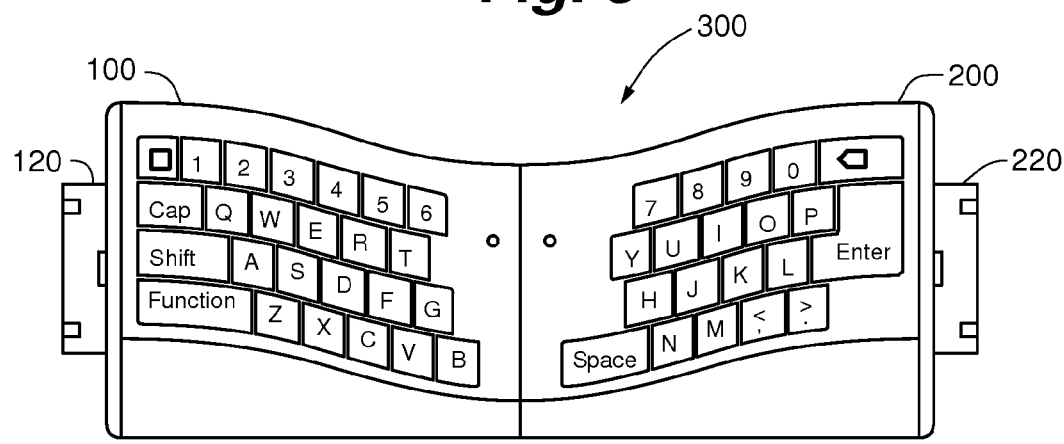
FIG. 3 is a front-face plan view of the first and second keyboards joined together to form a single merged keyboard.

The two keyboards 100, 200 can optionally be joined together to form a single merged keyboard 300, as shown in FIG. 3. To facilitate the joining of the two keyboards 100, 200 together, the second keyboard 200 utilizes a pair of posts 250 found on the facing side 240 of the keyboard 200. The facing side 240 of keyboard 200 is that side that faces the first keyboard 100 when the two keyboards are in use. In one embodiment, the first keyboard 100 and second keyboard 200 combine to provide the letters of the alphabet in a "qwerty" keyboard configuration, with the first keyboard 100 being positioned to the left of the second keyboard 200 to create the qwerty configuration. In this position, the facing side 240 of the second keyboard 200 will be positioned facing left toward the first keyboard 100. Similarly, the facing side 140 of the first keyboard 100 is that side of the keyboard 100 which faces the second keyboard 200 during use (namely the right side in the examples shown in the Figures). The posts 250 mate with holes 150 found on the facing side 140 of the first keyboard 100. In the preferred embodiment, each post 250 is constructed with an indentation 252 on a side portion of the post 250. A matching protrusion is located within each hole 150. By spring loading the protrusion, the distal end of the post 250 (that part of the post 250 most distal from the facing side 240 of the second keyboard 200), may push aside the protrusion when the post 250 is inserted into the hole 150. By continuing to push the post 250 into the hole 150, the spring-biased protrusion will line up with the indentation 252 and hold the post 250 within the hole 150 by pushing into the indentation 252. The spring tension urges the protrusion against the indentation 252, which holds the two keyboards 100, 200 together as a merged keyboard 300. The user may later separate the merged keyboard 300 by simply pulling the keyboards 100, 200 apart.

In the preferred embodiment, only one of the two keyboards 100, 200 directly interfaces with a tablet computer. This keyboard is considered the master keyboard, and it communicates with the tablet computer interface via a radio frequency signal. In the preferred embodiment, this RF signal is a Bluetooth connection that complies with one of the standards of the Bluetooth Special Interest Group (such as the Bluetooth low energy, or "Bluetooth Smart," standard for low power devices). The second keyboard, known as the slave keyboard, sends all of its keystrokes to the master keyboard. When the master keyboard receives keystrokes from the slave keyboard, it forwards those keystrokes on to the tablet computer over the Bluetooth interface. In the Figures, the first keyboard 100 could be configured as the slave keyboard and the second keyboard 200 could be configured as the master keyboard. The communication of keystrokes from the slave keyboard 100 to the master keyboard 200 can take place over a wired or wireless connection. In FIG. 1, the first keyboard 100 is shown with a male electrical connector 160 on its facing side 140 which interfaces with a matches a female electrical connector 260 found on the facing side of the second keyboard 200. When the two keyboards 100, 200 are joined into the merged keyboard 300, keystrokes received on the first keyboard are communicated via the wired connection created by interfaces 160, 260, and then sent via Bluetooth to the tablet computer.

Figure 4:
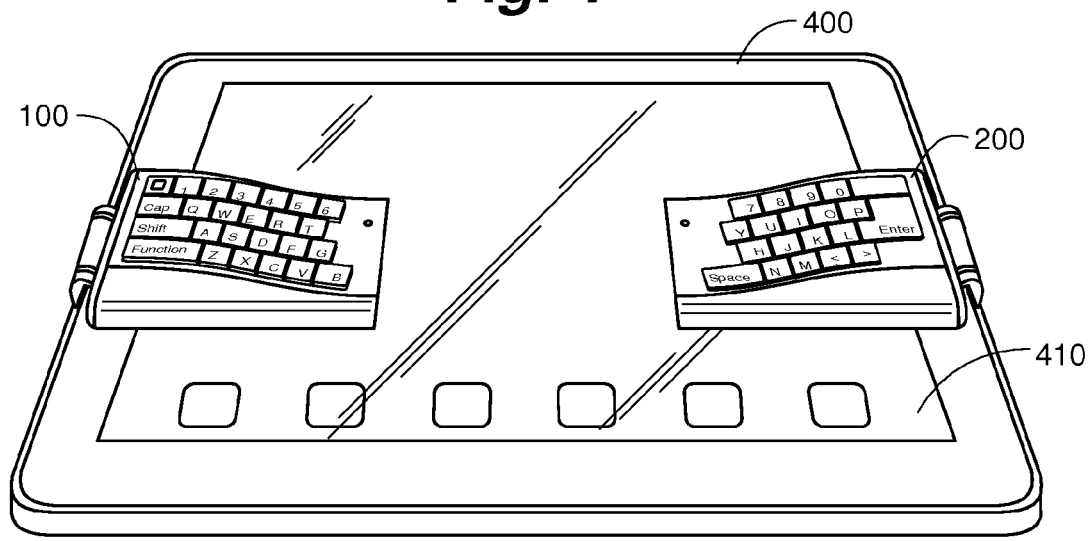
FIG. 4 is a perspective view of the split keyboard system in use with a tablet computer.

In FIG. 4, the two keyboards 100, 200 are shown separated, located on the left and right side, respectively, of a tablet computer 400. As can be seen in this figure, the two keyboards 100, 200 are mounted directly on the front, display face 410 of the tablet computer 400. The two keyboards 100, 200 are sized so that they can be reached by a user's thumbs while the user is holding the tablet computer 400. For instance, if tablet 400 has a longest dimension of between 9-10 inches, keyboard 100 is sized so that the furthest reach from the hinge 120 to any key on the keyboard 100 is less than 3 inches.

As was also the case in FIG. 3, the facing side 140 of the first keyboard 100 still faces the facing side 240 of the second keyboard 200 in FIG. 4, even though the two facing sides 140, 240 are not in contact with one another. In the embodiment shown in FIG. 4, the male and female connectors 160, 260 cannot engage. In fact, FIG. 4 does not show the male connector 160 on the first keyboard 100. In one embodiment, the male connector 160 is a retractable connector that can be retracted into the facing side 140 of the first keyboard 100 when it is not in use. In another embodiment, the male and female connectors 160, 260 are simply excluded from the design and construction of the keyboards 100, 200.

In the embodiment shown in FIG. 4, keystrokes received on the slave keyboard 100 are sent wirelessly to the master keyboard 200 before they are forwarded to the tablet computer 400 via the Bluetooth link. In one embodiment, these keystrokes are transmitted from the slave keyboard by an infrared transmitter 170. This transmitter 170 is located on the facing side 140 of the first keyboard, and transmits an infrared signal to an infrared receiver 270 found on the facing side 240 of the second keyboard 200. When a key 110 is pressed on the first keyboard 100, it is translated into an infrared signal that is transmitted over the transmitter 170 to receiver 270. The second keyboard receives this signal, and translates it to a keystroke signal that is sent to the tablet computer 400.

In a different embodiment, the communication between the first keyboard 100 and the second keyboard 200 takes place over a radio frequency communication path as opposed to an infrared light communication path. This radio communication path between the keyboards 100, 200 can formatted according to a Bluetooth protocol similar to the protocol used to communicate with the tablet computer 400. When using a Bluetooth protocol, it is advisable to configure the first keyboard 100 to be generally non-discoverable except during the linkage between the first and second keyboard 100, 200. This means that the tablet computer 400 will not detect the presence of first (slave) keyboard 100 even when the tablet 400 is attempting to link with an external keyboard. At the same time, the second keyboard 200 will be discoverable. This means that the tablet computer 400 will sense only the Bluetooth connection of the second (master) keyboard 200, and all communications between either keyboard 100, 200 will take place over the Bluetooth connection established between the second keyboard 200 and the tablet computer 400.

As explained above, when the slave keyboard 100 encounters a period of inactivity, it can turn off power to its internal components to save battery life until a user presses a key 110 on the keyboard 100. The master keyboard 200 may also power down, but it must power back up in response to a press of its own keys 210 or to a signal received from the slave keyboard 100. If the master keyboard 200 were to sleep in power off mode until a key 210 has been pressed, the master keyboard 200 may not receive and properly handle a wireless signal from the slave keyboard 100. To avoid this issue, the master keyboard 200 may maintain power on its receiver components, such as the infrared receiver 270 or its Bluetooth receiver in order to be able to handle signals from the slave keyboard 100. If the two keyboards 100, 200 are connected via wire (such as through connectors 160, 260), then the two keyboards 100, 200 could wake simultaneously in response to the press of a key 110, 210, on either keyboard. In some embodiments, the master keyboard 200 would operate identically to the slave keyboard 100, and it would be necessary to press a key on the master keyboard 200 to wake it before the master keyboard 200 would transmit a signal received from the slave keyboard 100. In these instances, a power button may be placed on the master keyboard 200 that would wake it without transmitting a keystroke to the tablet computer 400.

In yet another embodiment, both keyboards 100, 200 can establish separate and independent RF (e.g., Bluetooth) connections to the tablet computer 400. One advantage of this embodiment is that both keyboards 100, 200 may sleep and avoid draining any power from their batteries until a key 100, 200 is pressed by a user. A second advantage of this embodiment is that it is not necessary to establish a data communication path between the two keyboards 100, 200, nor require two separate data pathways within the master keyboard 200 for the transmission of keystrokes to the tablet computer 400. One disadvantage is that the operator of the tablet computer 400 must establish separate Bluetooth pairings with each keyboard 100, 200, which may cause confusion for novice users.

Figure 5:
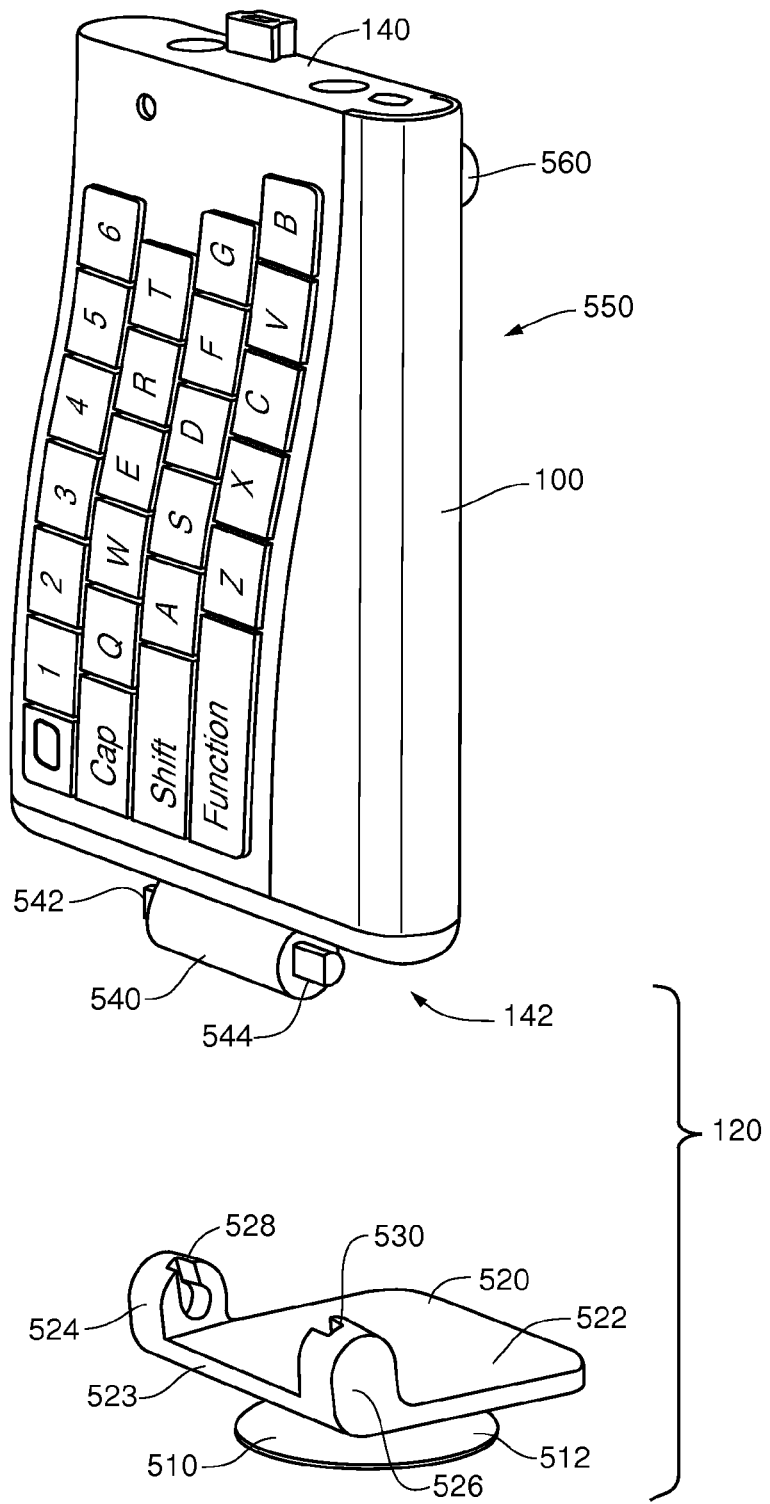
FIG. 5 is an exploded perspective view of the first keyboard separated from a portion of a separable hinge.

FIG. 5 shows the details of the separable hinge 120 that is used to attach the first keyboard 100 to the tablet computer 400. The separable hinge 120 includes a suction cup 510 that can be used to secure the hinge 120 to the flat face 410 of the tablet computer 400. The closed end of the suction cup 510 is attached to a base portion 520 of the hinge 120. When the open end of the suction cup 510 is pressed against the face 410 of the tablet computer 400, air is expelled from under the cup 510 which creates a pressure difference between the outside of the cup 510 and under the cup 510, thereby holding the cup 510 and the base portion 520 of the hinge 120 to the tablet computer 400. In the preferred embodiment, the suction cup 510 has a circular shape with a diameter that is wider than base portion 520, such that at least one edge 512 of the suction cup 510 is not completely hidden by the base portion 520 when attached to the tablet computer 400. This allows a user to lift the edge 512 of the suction cup 510 to pressurize the area under the suction cup 510, thereby releasing its grip on the display 410 of the tablet computer 400. In some embodiments, a protrusion (not shown) on the cup 510 assists the user in lifting the edge 512 of the cup 510 during the removal process.

The base portion 520 of the hinge 120 includes a flat support portion 522 and two raised pivot arms 524, 526. Each pivot arm 524, 526 extends from a rear end 523 of the base portion 520. In addition, each pivot arm 524, 526 contains a slot 528, 530 that is sized and shaped to receive an extension 542, 544 found on the keyboard portion 540 of the hinge 120. The keyboard portion 540 is fixedly attached to the keyboard 100 and is located on the hinge side 142 of the keyboard 100 opposite the facing side 140. Each extension 542, 544 has a D-shaped cross section, and can be inserted into the slots 528, 530 only when the keyboard 100 is positioned perpendicularly with respect to the support portion 522, as shown in FIG. 5. This is because the opening of each slot 528, 530 is more narrow than the lower portion of each slot 528, 530, as shown in FIG. 5. When the arms 542, 544 are fully inserted into the slots 528, 530, the arms 542, 544 can pivot within the slots 528, 530 so that the keyboard 100 extends parallel to and in contact with the support portion 522 of the hinge 120. In effect, the arms 542, 544 and the pivot arms 524, 526 form the pivot portion of the hinge 120 (like a barrel in a standard hinge) about which the keyboard 100 can rotate with respect to the base portion 520.

Figure 6:
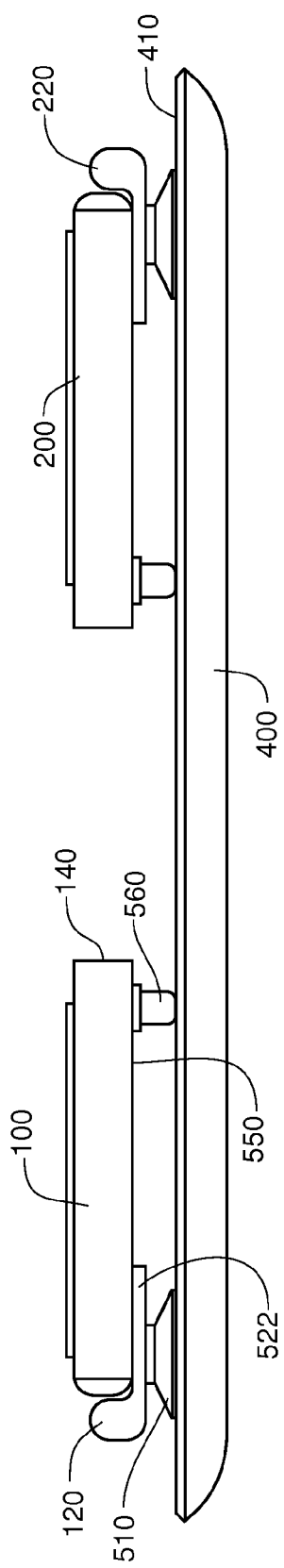
FIG. 6 is a bottom-side plan view of the split keyboard system in use with the tablet computer.

As shown in FIG. 6, each keyboard 100, 200, can be attached to the display face 410 of the tablet computer 400 via their removable hinges 120, 220. The keyboard 100 is shown in FIG. 6 with a bottom side 550 of the keyboard 100 resting on the support portion 522 of the hinge 120, with the suction cup 510 firmly attached to face 410. As shown in FIGS. 5 and 6, the keyboard 100 is also outfitted with at least one foot 560 that is located on the bottom side 550 of the keyboard 100 proximal to the keyboard's facing side 140. This foot 560 is sized so as to rest against the display face 410 of the tablet computer 400 when the suction cup 510 of the hinge is attached to the face 410 and the bottom 550 of the keyboard 100 rests on the support surface 522 of the hinge 120. In one embodiment, two feet 560 are located on the bottom surface 550 of the keyboard 100, each equidistant from the keyboard's facing side 140. These feet 560 keep the keyboard 100 stable during the pressing of the keys 110 on the keyboard 100. As shown in FIG. 6, the second keyboard 200 is similarly constructed.

Figure 7:
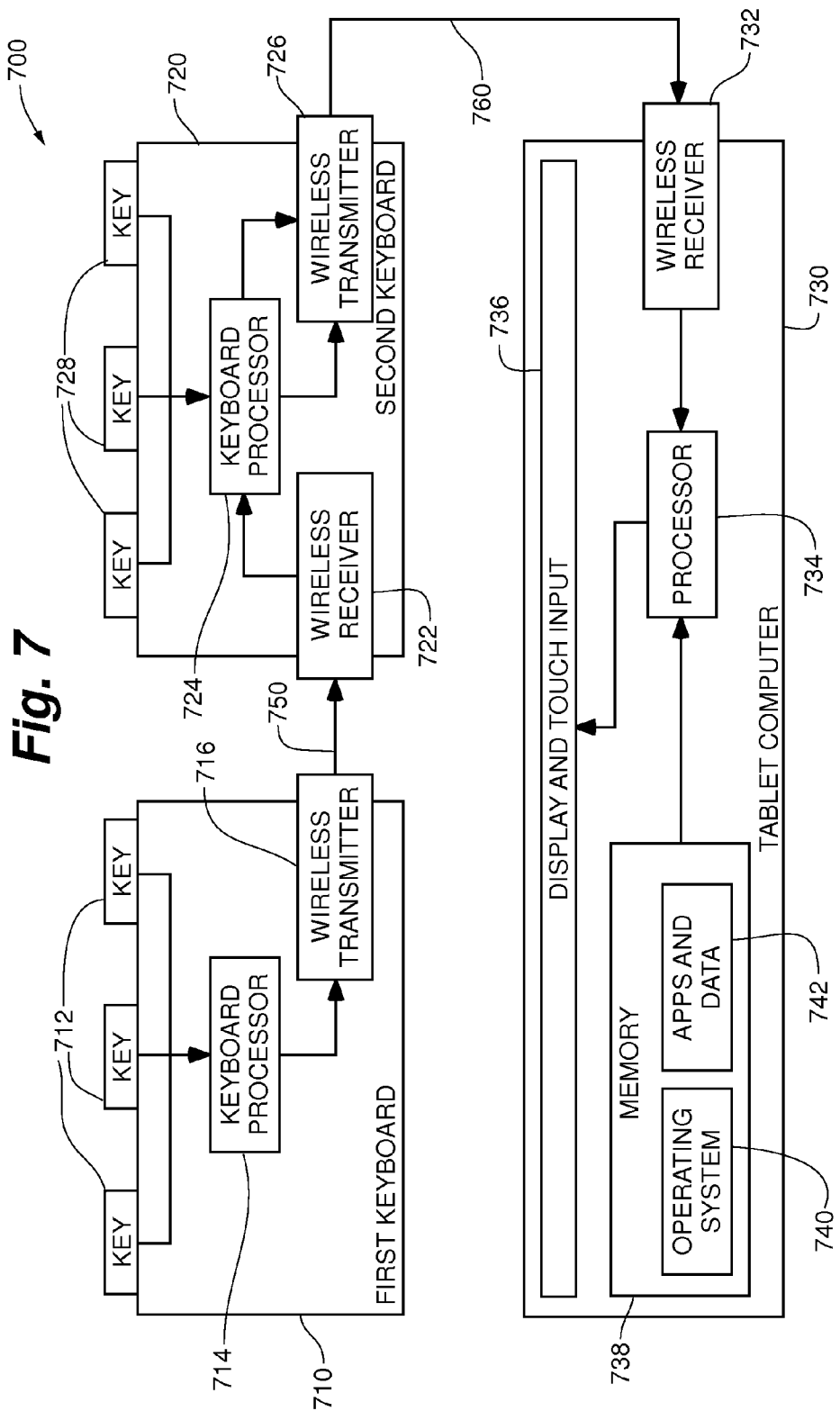
FIG. 7 is a schematic diagram showing the internal components of the split keyboard system and the tablet computer.
Figure 8:
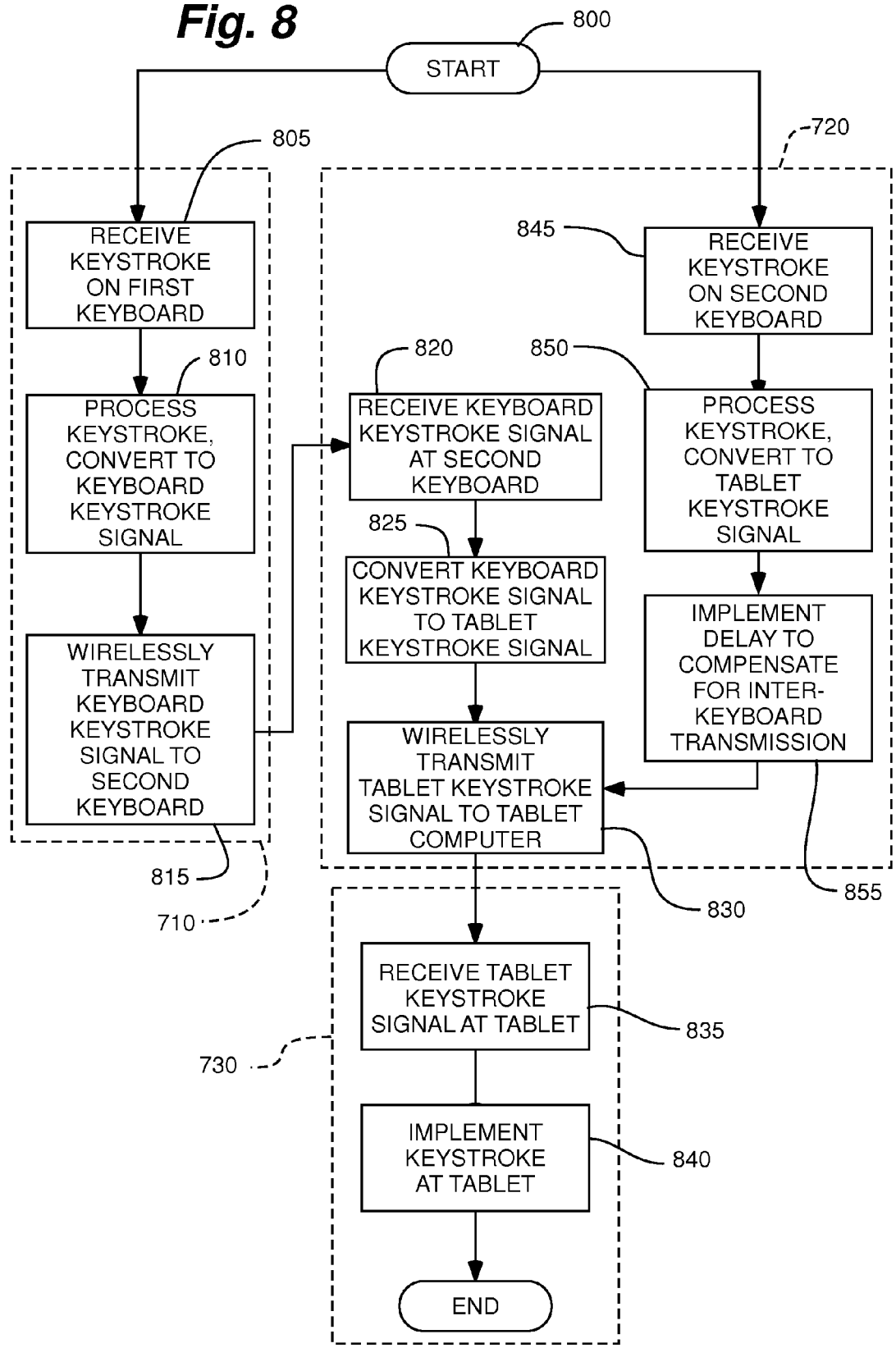
FIG. 8 is a flow chart showing the process used by one embodiment of the present invention.

FIG. 7 schematically shows an embodiment of a system 700 that uses a first (or slave) keyboard 710 and a second (or master) keyboard 720 to send keystroke signals to a tablet computer 730. This system 700 is used in combination with the process 800 shown in FIG. 8. In FIG. 8, steps 805-815 are shown within dashed box 710, indicating that these steps occur on the first keyboard 710. Similarly, steps 820-830, and steps 845-855 occur on the second keyboard 720, while steps 835 and 840 occur on tablet 730.

The process 800 begins at step 805, when the first keyboard 710 receives a keystroke from one of the keys 712 found on the keyboard 710. A keyboard processor 714 receives this keystroke from the source key 712 and then creates an appropriate keyboard keystroke signal 750 for that key 712 (step 810). The keyboard processor 714 can be a programmed, general-purpose microcontroller such as those made available through Intel Corporation (Santa Clara, Calif.), or can be an application-specific integrated circuit (or "ASIC") or a field programmable device (such as an FPGA) specifically designed to handle the processing requirements of the keyboards 710, 720. While it is preferred that the keyboard processor 714 be formed as a single silicon chip or electronic element, it is possible to implement the different functions of the keyboard processor 714 in physically separate electronic devices. A wireless transmitter 716 then sends the keyboard keystroke signal 750 to the second keyboard 720 at step 815. In the preferred embodiment, the wireless transmitter 716 transmits infrared light signals or radio frequency signals from the first keyboard 710 to the second keyboard 720.

The second keyboard 720 has a wireless receiver 722 that receives the keyboard keystroke signal 750 from the first keyboard 710 at step 820. The second keyboard 720 also contains a keyboard processor 724 that converts the keyboard keystroke signal 750 into a signal that would be understood by the tablet computer 730 at step 825. A wireless transmitter 726 built into the second keyboard 720 then transmits this tablet keystroke signal 760 at step 830.

The tablet computer 730 receives the tablet keystroke signal 760 via its wireless receiver 732 (step 835). A processor 734 receives the tablet keystroke signal 760 and implements the keystroke at step 840. The processor 734 will implement the keystroke according to its operating system 740 and the applications and related data 742 that are currently operating on the processor 734. The tablet computer 730 stores the operating system 740 and the applications and related data 742 in its memory 738. The results of the processing in step 840 are then displayed on the display/touch input device 736 of the tablet 730, and the process 800 ends for that keystroke.

The second keyboard 720 also has a plurality of keys 728 that receive input from a user of the system 700. When these keys 728 register a keystroke, a keystroke signal is sent from the keys 728 to the keyboard processor 724 on the keyboard 720. This is shown in step 845 in FIG. 8, which forms a second way in which process 800 can start. At step 850, the keyboard processor 724 processes this signal, and converts the signal into a tablet keystroke signal that could be sent by the wireless transmitter 726 to the tablet computer 730.

Keyboard 720 is designed to transmit keystroke signals 760 to the tablet computer 730 whether the keystroke originated with a pressed key 712 on the first keyboard 710, or a pressed key 728 on the second keyboard 720. In use, the system 700 will be receiving keystrokes on both keyboards 710, 720, with a user using both of their hands to press keys 712, 728 on either keyboard 710, 720. Because it is important for the signals 760 for each keystroke to be sent to the tablet computer 730 in the same order that the related keys 712, 728 were pressed by the user, it is sometimes necessary to delay the keystroke signals 760 that originate on the second keyboard 720. This is because the steps required before the transmission of a signal based on pressing keys 712 (namely steps 815-825) can take a fraction of a second longer to implement than steps required before the transmission of a signal based on pressing keys 728 (namely steps 845-850). In these circumstances, step 855 implements a delay before transmitting keystrokes received on keys 728. After this delay, these keystroke signals 760 are transmitted by the wireless transmitter 726 at step 830, and are implemented by the tablet computer 730 in steps 835-840.

Figure 9:
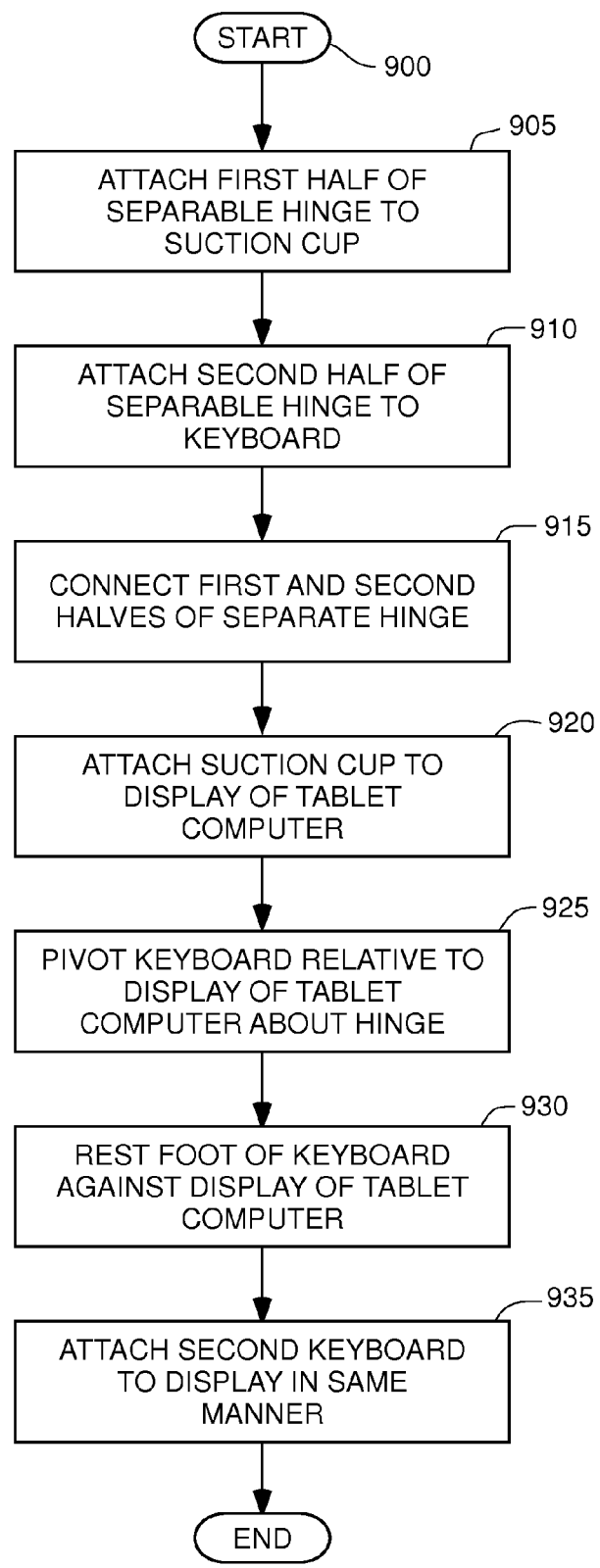
FIG. 9 is a flow chart showing the process used to attach one embodiment of a split keyboard to a tablet computer.

FIG. 9 shows a process 900 for attaching a keyboard to a tablet computer. To clarify this process 900, it will be described using the embodiments shown in FIGS. 1-5 above, although it would be possible to implement process 900 using other configurations. The process 900 begins at step 905, where the first half of the separable hinge 120 (such as base portion 520) is attached to a suction cup 510. At step 910, the second half of the separable hinge 120 (the keyboard portion 540) is attached to the keyboard 100. At step 915, these two halves 520, 540 are connected. For the embodiment shown above, this is accomplished by sliding the D-shaped arms 542, 544 of the keyboard portion 540 into the slots 528, 530 found in the base portion 520. When the two halves 520, 540 of the separable hinge 120 are combined, they provide a functioning hinge that allows for rotation of the keyboard 100 with respect to the suction cup 510.

At step 920, the suction cup 510 is attached to the display 410 of a tablet computer 400. As explained above, this is accomplished by pressing the cup 510 to remove the air located between the cup 510 and the display 410. The suction cup 510 is most easily attached when the keyboard 100 is rotated perpendicularly with respect to the support section 522 of base portion 520, such as shown in FIG. 5. At step 925, the keyboard 100 is rotated downward relative to the display 410 of the tablet computer about the hinge 120. This should bring the bottom side 550 of the keyboard 100 to rest on the support section 522, as shown in FIG. 6. In this position, the keyboard foot 560 should also be brought into contact with the tablet display 410 (step 930). At step 935, a second keyboard 200 can be physically attached to the tablet display 410 in the same manner (by applying steps 905-930 to the second keyboard 200). At this point, process 900 terminates and the keyboards 100, 200 are ready for use (according to process 800).

By making hinge 120 "separable," it is possible to separate the keyboard 100 from the suction cup 510. It is, of course, possible to implement hinge 120 is such a way that the keyboard 100 is not separable from the suction cup 510. This would still allow rotation of the keyboard 100 with respect to the suction cup 510 and the tablet computer 400, but it would eliminate the feature of removing the keyboard 100 temporarily while keeping the suction cup 510 in place. Furthermore, it is possible to connect the keyboard 100 to the suction cup 510 without the use of a rotating hinge 120 at all. This would allow use of the keyboard 100 in the configuration shown in FIG. 4, but prevent the keyboard 100 from being easily tilted to see more of the tablet screen 410 without removing the keyboard 100.

It is also possible to develop different attachment mechanisms altogether for the two keyboards 100, 200. For instance, instead of hinges 120, 220, the keyboards 100, 200 could be constructed with clamps that clamp to the edges of the tablet computer 400. These clamps could also be constructed with hinges to allow the keyboard to rotate upwards for temporarily viewing that portion of the tablet display 410 that may be covered by the keyboards 100, 200.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A keyboard for a tablet computer comprising:
a) a keyboard body having a top side and a bottom side;
b) a set of keys located on the top side of the keyboard body;
c) a first suction cup having a closed end and an open end, with the closed end attached to the bottom side of the keyboard body, wherein the first suction cup further comprises a first hinge having:
 i) a first portion attached to the keyboard body,
 ii) a second portion attached to the closed end of the first suction cup, the second portion having a flat support surface roughly parallel to an opening defined by the open end of the first suction cup, and
 iii) a pivot portion between the first and second portions that allows the first and second portions to rotate with respect to one another;
 wherein the bottom side of the keyboard body rests on the flat support surface of the second portion of the first hinge when the keyboard is in a use position;
d) a radio frequency transmitter for transmitting keystrokes, based on pressed keys in the set of keys, as radio frequency signals;
e) a tablet computer having:
 i) a radio frequency receiver for receiving the transmitted keystrokes, and
 ii) a flat display screen,
 wherein the open end of the first suction cup is attached to the flat display screen of the tablet computer;
f) a first foot located on the bottom side of the keyboard body, the first foot contacting the flat display screen of the tablet computer when the keyboard body rests on the flat support surface in the use position and the open end of the first suction cup is attached to the flat display screen; and
g) a second keyboard body having:
 i) a top side and a bottom side,
 ii) a second set of keys located on the top side of the second keyboard body, the second set of keys including a plurality of keys not found in the first set of keys,
 iii) a second foot located on the bottom side of the second keyboard body,
 iv) a second hinge attached to the bottom side of the second keyboard body, the second hinge having a second hinge pivot point, and
 v) a second suction cup having a closed end attached to the second hinge opposite the second hinge pivot point of the keyboard body, the second suction cup also have an open end attached to the flat display screen of the tablet computer
 wherein the first and second keyboard bodies are arranged such that the first suction cup is located proximal a first edge of the flat display screen and the second suction cup is located proximal to a second edge of the flat display screen opposite the first edge, such that the first and second feet are located nearer each other than the first and second suction cups.

2. The keyboard of claim 1, wherein the second keyboard body further comprises:
   vi) a second wireless transmitter that transmits keyboard keystroke signals;
   wherein the keyboard further comprises a wireless receiver on the first keyboard body that receives keyboard keystroke signals from the second wireless transmitter; and
   further wherein the radio frequency transmitter transmits to the tablet computer keystrokes based on keyboard keystroke signals received from the second keyboard body.

3. The keyboard of claim 2, wherein the second wireless transmitter transmits an infrared signal.

4. The keyboard of claim 1, wherein the first hinge is a separable hinge.

5. The keyboard of claim 4, wherein the pivot portion of the first hinge is formed by a pair of arms on the first portion of the first hinge resting in a pair of slots found on the second portion of the first hinge, wherein the first and second portions of the first hinge can be separated by removing the pair of arms from the pair of slots.

6. A keyboard for a tablet computer having a radio frequency receiver for receiving transmitted keystrokes and a flat display screen, the keyboard comprising:
   a) a first keyboard body having a top side and a bottom side;
   b) a first set of keys located on the top side of the first keyboard body;
   c) a first suction cup having a closed end and an open end, with the closed end attached to the bottom side of the first keyboard body,
   wherein the first suction cup further comprises a first hinge having:
      i) a first portion attached to the keyboard body,
      ii) a second portion attached to the closed end of the first suction cup, the second portion having a flat support surface roughly parallel to an opening defined by the open end of the first suction cup, and
      iii) a pivot portion between the first and second portions that allows the first and second portions to rotate with respect to one another;
   wherein the bottom side of the keyboard body rests on the flat support surface of the second portion of the first hinge when the keyboard is in a use position, and
   wherein the open end of the first suction cup is attachable to the flat display screen of the tablet computer;
   d) a radio frequency transmitter for transmitting keystrokes, based on pressed keys in the first set of keys, as radio frequency signals;
   e) a first foot located on the bottom side of the keyboard body, the first foot positioned to contact the flat display screen of the tablet computer when the keyboard body rests on the flat support surface in the use position and the open end of the first suction cup is attached to the flat display screen; and
   f) a second keyboard body having:
      i) a top side and a bottom side,
      ii) a second set of keys located on the top side of the second keyboard body, the second set of keys including a plurality of keys not found in the first set of keys,
      iii) a second foot located on the bottom side of the second keyboard body,
      iv) a second hinge attached to the bottom side of the second keyboard body, the second hinge having a second hinge pivot point, and
      v) a second suction cup having a closed end attached to the second hinge opposite the second hinge pivot point of the keyboard body, the second suction cup also have an open end attachable to the flat display screen of the tablet computer
   wherein the first and second keyboard bodies are arrangeable such that the first suction cup is located proximal a first edge of the flat display screen and the second suction cup is located proximal to a second edge of the flat display screen opposite the first edge, such that the first and second feet are located nearer each other than the first and second suction cups.

7. The keyboard of claim 6 wherein the second keyboard body further comprises:
   vi) a second wireless transmitter that transmits keyboard keystroke signals;
   wherein the keyboard further comprises a wireless receiver on the first keyboard body that receives keyboard keystroke signals from the second wireless transmitter; and
   further wherein the radio frequency transmitter transmits to the tablet computer keystrokes based on keyboard keystroke signals received from the second keyboard body.

8. The keyboard of claim 7, wherein the second wireless transmitter transmits an infrared signal.

9. The keyboard of claim 6, wherein the first hinge is a separable hinge.

10. The keyboard of claim 8, wherein the pivot portion of the first hinge is formed by a pair of arms on the first portion of the first hinge resting in a pair of slots found on the second portion of the first hinge, wherein the first and second portions of the first hinge can be separated by removing the pair of arms from the pair of slots.

* * * * *